United States Patent
Liu et al.

(10) Patent No.: US 12,118,139 B2
(45) Date of Patent: Oct. 15, 2024

(54) OPTICAL SYSTEM PROVIDING ACCURATE EYE-TRACKING AND RELATED METHOD

(71) Applicant: Ganzin Technology, Inc., Taipei (TW)

(72) Inventors: Kuan-Ling Liu, Kaohsiung (TW); Po-Jung Chiu, Nantou County (TW); Yi-Heng Wu, Tainan (TW); Kuei-An Li, New Taipei (TW); Shao-Yi Chien, Taipei (TW)

(73) Assignee: Ganzin Technology, Inc., Taipei (TW)

( * ) Notice: Subject to any disclaimer, the term of this patent is extended or adjusted under 35 U.S.C. 154(b) by 0 days.

(21) Appl. No.: 17/849,726

(22) Filed: Jun. 27, 2022

(65) Prior Publication Data

US 2022/0413605 A1  Dec. 29, 2022

Related U.S. Application Data

(60) Provisional application No. 63/215,984, filed on Jun. 28, 2021.

(51) Int. Cl.
*G02B 27/00* (2006.01)
*G02B 27/01* (2006.01)
(Continued)

(52) U.S. Cl.
CPC ......... *G06F 3/013* (2013.01); *G02B 27/0025* (2013.01); *G02B 27/0093* (2013.01); *G02B 27/0101* (2013.01); *G02B 27/017* (2013.01); *G02B 27/0179* (2013.01); *G06F 3/04815* (2013.01); *G06F 3/04842* (2013.01); *G02B 2027/014* (2013.01); *G02B 2027/0187* (2013.01)

(58) Field of Classification Search
CPC .............. G02B 27/0172; G02B 27/017; G02B 27/0093; G06F 3/013; G06F 3/04842; G06F 3/04812
See application file for complete search history.

(56) References Cited

U.S. PATENT DOCUMENTS 10,845,595 B1 * 11/2020 Sohn .................. G02B 27/0093
10,857,455 B2    12/2020 Marks
(Continued)

FOREIGN PATENT DOCUMENTS

CN    103635849 A    3/2014
CN    105979224 A    9/2016
(Continued)

OTHER PUBLICATIONS

Liu, the specification, including the claims, and drawings in the U.S. Appl. No. 17/849,727, filed Jun. 27, 2022.
(Continued)

*Primary Examiner* — Yuzhen Shen
(74) *Attorney, Agent, or Firm* — Winston Hsu

(57) ABSTRACT

During an eye-tracking operation of an optical system, one or multiple eye images are captured. One or multiple gaze points of the user are computed based on the one or multiple eye images of the user. A user interface containing one or multiple UI elements is provided based on the one or multiple gaze points of the user. A performance map of the eye-tracking operation is provided based on the one or multiple eye images of the user. At least one UI element is adjusted based on the performance map of the eye-tracking operation.

23 Claims, 15 Drawing Sheets

(51) Int. Cl.
  *G06F 3/01* (2006.01)
  *G06F 3/04815* (2022.01)
  *G06F 3/04842* (2022.01)

(56) References Cited

U.S. PATENT DOCUMENTS

| | | |
|---|---|---|
| 10,895,909 B2 | 1/2021 | Nijs |
| 11,423,569 B1 | 8/2022 | Carlsson |
| 2009/0315827 A1 | 12/2009 | Elvesjö |
| 2014/0028549 A1* | 1/2014 | Yuan ............... G06F 3/013 345/156 |
| 2014/0380230 A1 | 12/2014 | Venable |
| 2015/0015483 A1 | 1/2015 | Leigh |
| 2015/0049112 A1* | 2/2015 | Liu ............... G02B 27/017 345/633 |
| 2015/0091793 A1 | 4/2015 | Lee |
| 2015/0177833 A1 | 6/2015 | Vennström |
| 2015/0234460 A1 | 8/2015 | Irie |
| 2017/0351329 A1 | 12/2017 | Picard |
| 2017/0354883 A1 | 12/2017 | Benedetto |
| 2018/0224935 A1* | 8/2018 | Thunström ............ G06F 3/013 |
| 2019/0056785 A1 | 2/2019 | Suk |
| 2019/0113970 A1* | 4/2019 | Nijs .................. G06F 3/0393 |
| 2021/0012559 A1 | 1/2021 | Lindh |
| 2021/0048938 A1 | 2/2021 | Scott, II |
| 2021/0350624 A1 | 11/2021 | Komp |
| 2022/0124279 A1 | 4/2022 | Barros |

FOREIGN PATENT DOCUMENTS

| | | |
|---|---|---|
| TW | 201211936 A1 | 3/2012 |
| TW | 201738791 A | 11/2017 |
| TW | 202037152 A | 10/2020 |

OTHER PUBLICATIONS

Liu, the specification, including the claims, and drawings in the U.S. Appl. No. 17/849,736, filed Jun. 27, 2022.

Bryn Farnsworth, "10 Most Used Eye Tracking Metrics and Terms", Fixations and gaze points, Jul. 9, 2015, p. 1, iMotions A/S, Copenhagen, Denmark. retrieved on Sep. 25, 2023 from the Internet URL (https://imotions.com/blog/learning/10-terms-metrics-eye-tracking), Jul. 9, 2015.

* cited by examiner

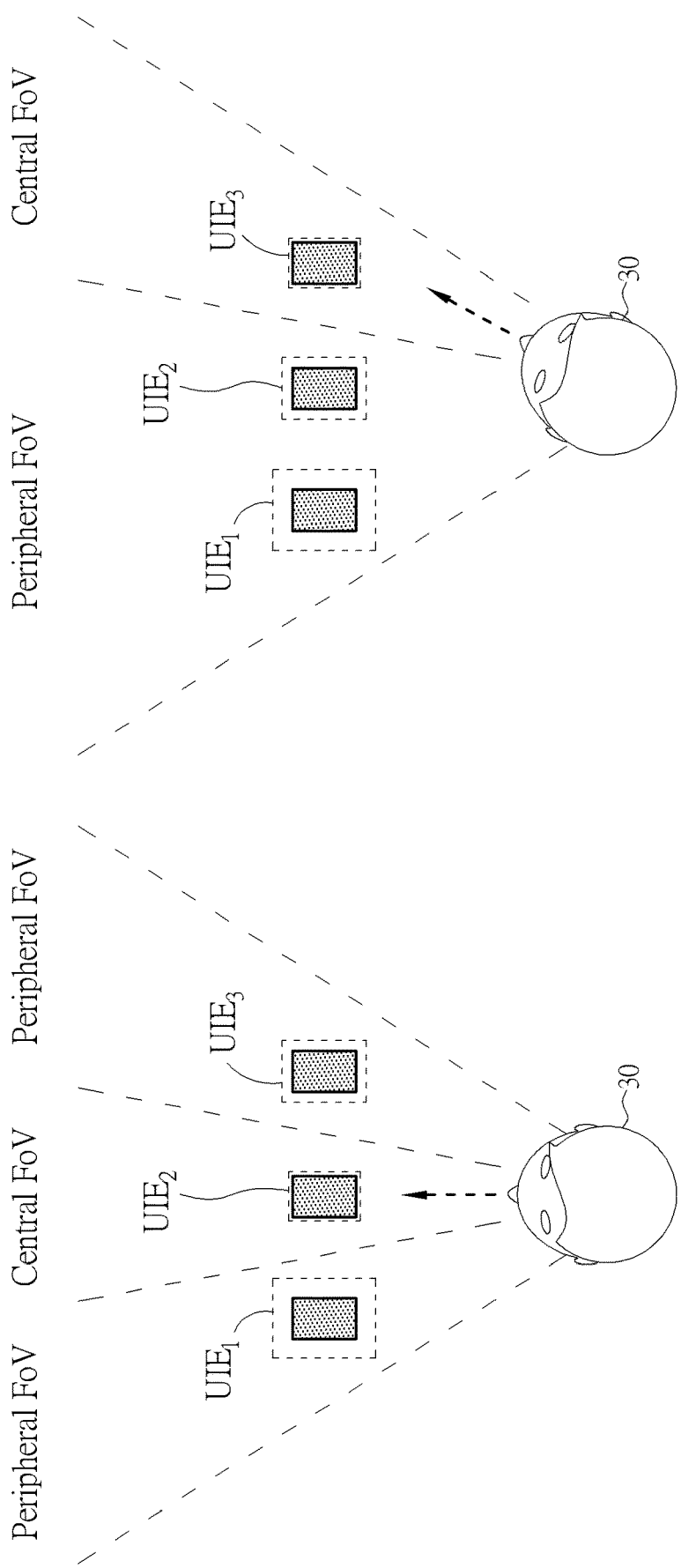

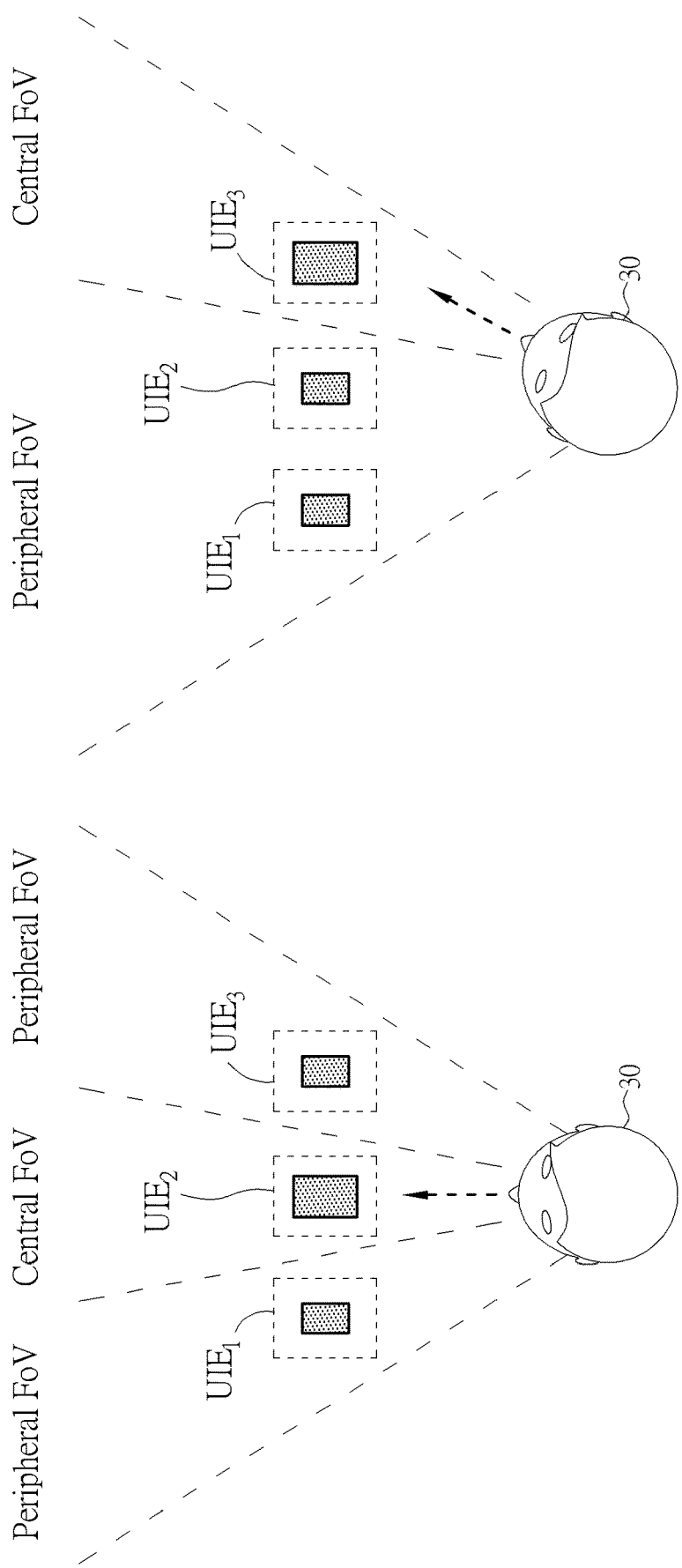

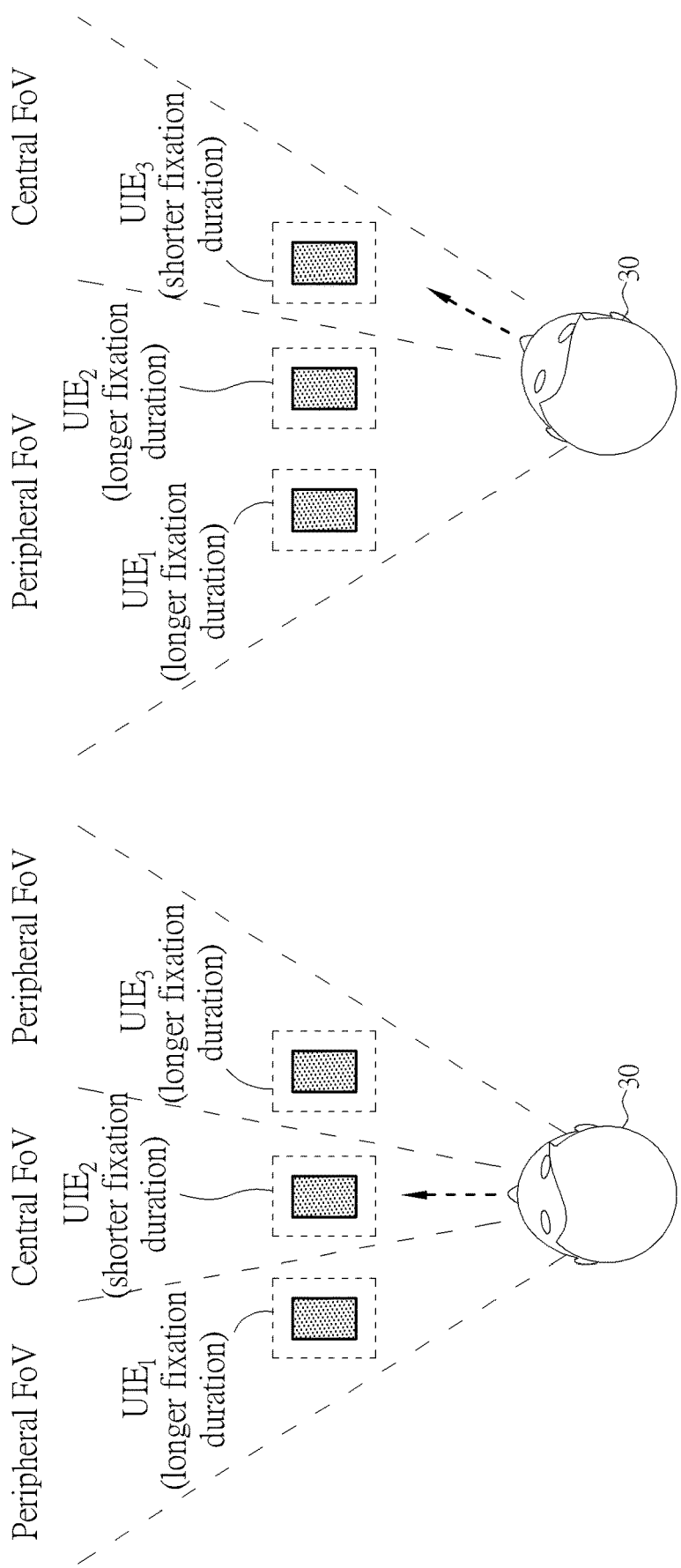

OPTICAL SYSTEM PROVIDING ACCURATE EYE-TRACKING AND RELATED METHOD

CROSS REFERENCE TO RELATED APPLICATIONS

This application claims the benefit of U.S. Provisional Application No. 63/215,984, filed on Jun. 28, 2021. The content of the application is incorporated herein by reference.

BACKGROUND OF THE INVENTION

1. Field of the Invention

The present invent is related to an optical system with accurate eye-tracking function and a related method, more particularly, to an optical system which improves user experience and the accuracy of gaze-based interaction and a related method.

2. Description of the Prior Art

Virtual reality (VR) is an interactive computer-generated experience taking place within a simulated environment, that incorporates mainly auditory and visual, but also other types of sensory feedback like haptic. Augmented reality (AR) provides an interactive experience of a real-world environment where the objects that reside in the real world are enhanced by computer-generated perceptual information. Mixed reality (MR) is the merging of real and virtual worlds to produce new environments and visualizations, where physical and digital objects co-exist and interact in real time. Most of existing VR/AR/MR applications are controlled by user hands using joysticks or touch screens, but the burden of carry these control devices may cause inconvenience. By incorporating eye-tracking capabilities into VR/AR/MR headsets, the user can use the eyes as an operational interface, wherein various visual elements can trigger certain responses and behaviors.

Eye tracking is a technology for acquiring eye positions and eye movement by measuring either the point of gaze or the motion of an eye relative to the head. Most information presented by a computer is provided to a user through visual information on a user interface presented on a display. Typically, a user interface contains multiple user interface (UI) elements each including a graphic element and a hit box. The graphic element determines the appearance of the UI element and may be associated with the function of the UI element. The hit box of a UI element is a virtual element which is invisible to the user and is connected to a corresponding event handler. When a gaze command of the user triggers the hit box of a UI element, a predetermined action associated with the UI element may be performed.

The performance of eye-tracking operation and the presentation of the user interface are essential to gaze-based interaction between a user and an optical system. Therefore, there is a need of an optical system and a related method for improving user experience and the accuracy of gaze-based interaction.

SUMMARY OF THE INVENTION

The present invention provides an optical system which improves user experience and accuracy of gaze-based interaction and includes an eye-tracker and a head-mounted display. The eye-tracker includes a first sensor module configured to capture one or multiple eye images of a user. The head-mounted display includes a processor and a display. The processor is configured to provide a user interface which contains one or multiple UI elements based on one or multiple gaze points of the user which are computed based on the one or multiple eye images; acquire a performance map of the eye-tracker based on the one or multiple eye images of the user; and adjust at least one UI element among the one or multiple UI elements of the user interface based on the performance map of the eye-tracker. The display is configured to present the user interface.

The present invention also provides a method of improving user experience and accuracy of gaze-based interaction. The method includes capturing one or multiple eye images of a user during an eye-tracking operation; computing one or multiple gaze points of the user based on the one or multiple eye images of the user; providing a user interface containing one or multiple UI elements based on the one or multiple gaze points of the user; acquiring a performance map of the eye-tracking operation based on the one or multiple eye images of the user; and adjusting at least one UI element among the one or multiple UI elements of the user interface based on the performance map of the eye-tracking operation.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 7A and 7B are diagrams illustrating a method of adjusting the setting of at least one UI element according to another embodiment of the present invention.

FIGS. 8A and 8B are diagrams illustrating a method of adjusting the setting of at least one UI element according to another embodiment of the present invention.

FIGS. 9A and 9B are diagrams illustrating a method of adjusting the setting of at least one UI element according to another embodiment of the present invention.

DETAILED DESCRIPTION

Figure 1:
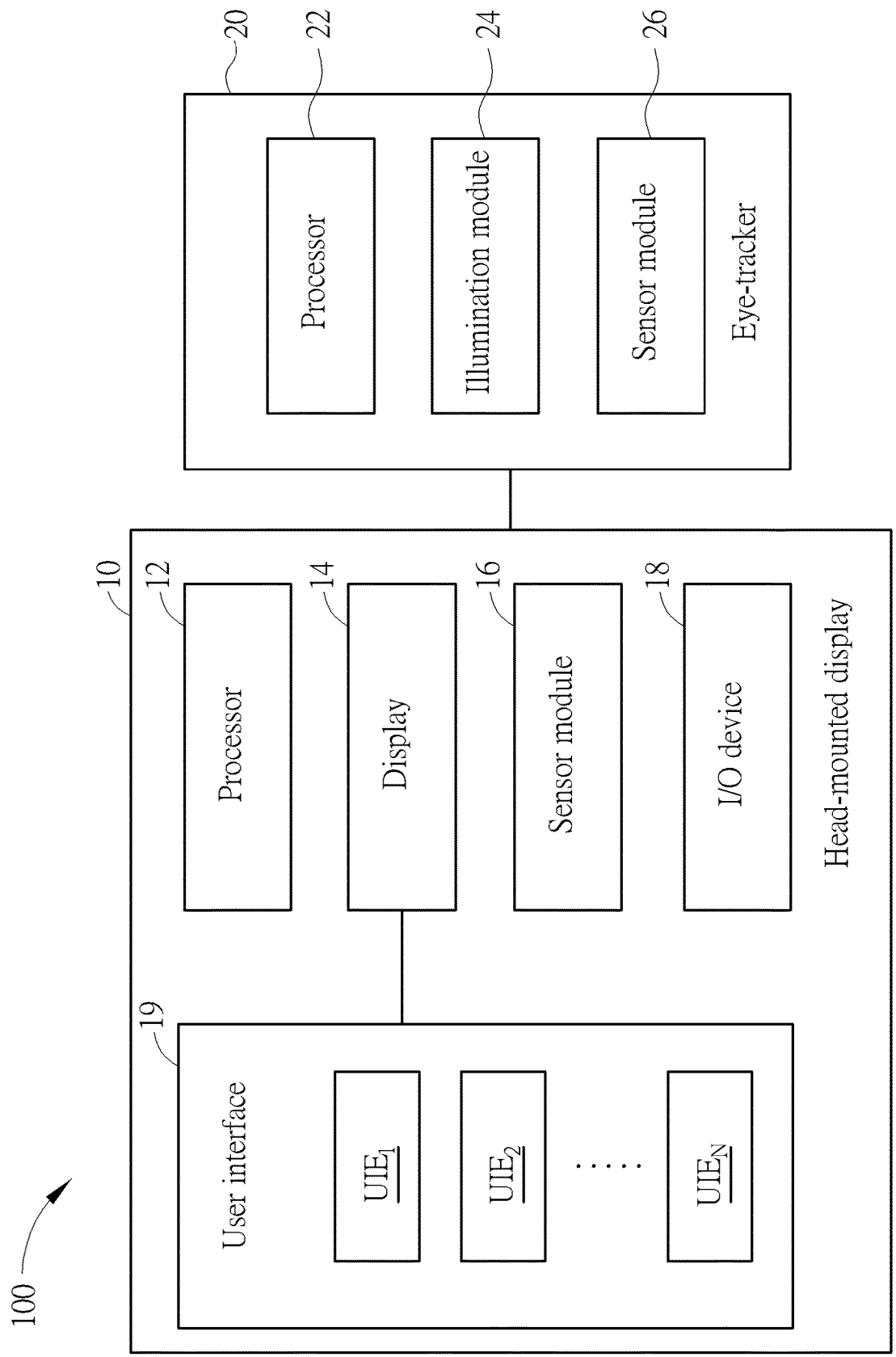
FIG. 1 is a functional diagram illustrating an optical system capable of improving user experience and the accuracy of gaze-based interaction according to an embodiment of the present invention.
Figure 2:
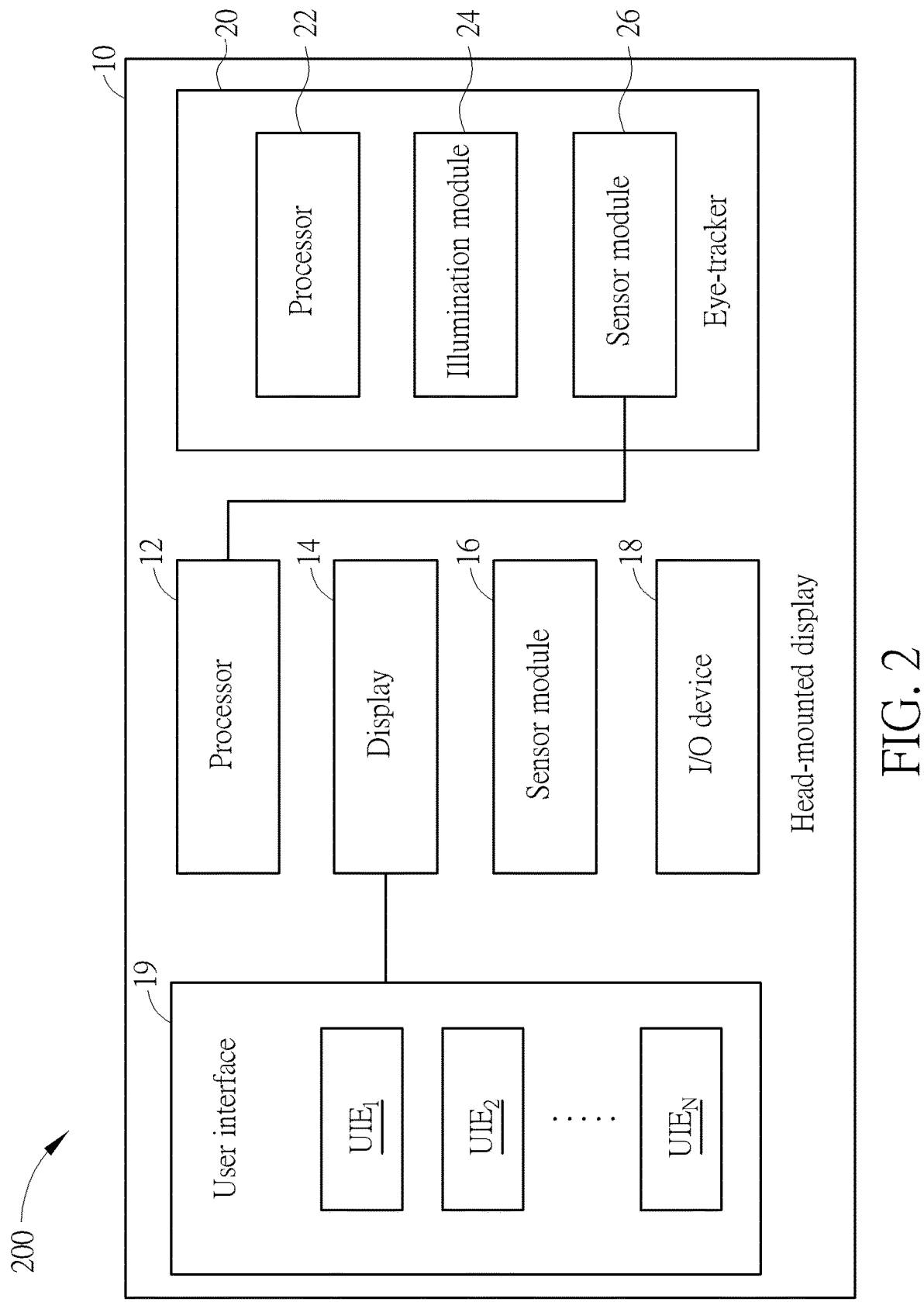
FIG. 2 is a functional diagram illustrating an optical system capable of improving user experience and the accuracy of gaze-based interaction according to another embodiment of the present invention.

FIG. 1 is a functional diagram illustrating an optical system 100 capable of improving user experience and the accuracy of gaze-based interaction according to an embodiment of the present invention. FIG. 2 is a functional diagram illustrating an optical system 200 capable of improving user experience and the accuracy of gaze-based interaction according to another embodiment of the present invention. In the embodiment illustrated in FIG. 1, the optical system 100 includes a head-mounted display 10 and an eye-tracker 20. The head-mounted display 10 includes a processor 12, a display 14, a sensor module 16, an I/O device 18 and a user interface 19. The eye-tracker 20 includes a processor 22, an illumination module 24, and a sensor module 26. The processor 12 is configured to control the operation of the head-mounted display 10, and the processor 22 is configured to control the operation of the eye-tracker 20.

In the embodiment illustrated in FIG. 2, the optical system 200 may be a head-mounted display 10 which includes a processor 12, a display 14, a sensor module 16, an I/O device 18, a user interface 19 and an eye-tracker 20. The eye-tracker 20 includes a processor 22, an illumination module 24, and a sensor module 26. The processor 12 is configured to control the operation of the head-mounted display 10, and the processor 22 is configured to control the operation of the eye-tracker 20. In another embodiment of the optical system 200, the processor 22 may be omitted. More specifically, the head-mounted display 10 and the eye tracker 20 may share the same processor 12 which is configured to control the operation of the head-mounted display 10 and the eye-tracker 20.

Figure 3:
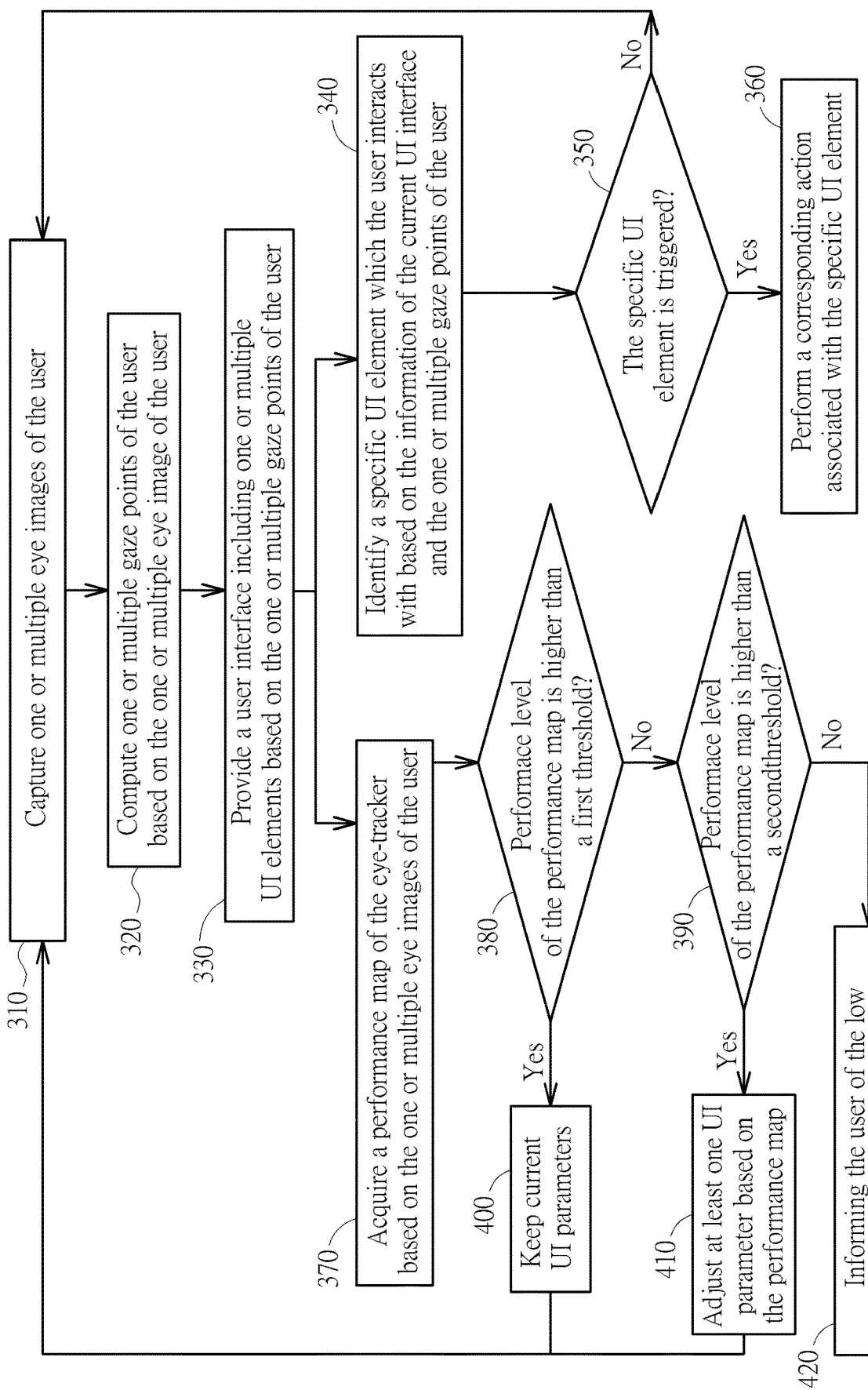
FIG. 3 is a flowchart illustrating a method of improving user experience and the accuracy of gaze-based interaction according to an embodiment of the present invention.

FIG. 3 is a flowchart illustrating a method of improving user experience and the accuracy of gaze-based interaction according to an embodiment of the present invention. The flowchart in FIG. 3 includes the following steps:

Step 310: capture one or multiple eye images of the user; execute step 320.

Step 320: compute one or multiple gaze points of the user based on the one or multiple eye image of the user; execute step 330.

Step 330: provide a user interface including one or multiple user interface (UI) elements based on the one or multiple gaze points of the user; execute steps 340 and 370.

Step 340: identify a specific user interface (UI) element which the user interacts with based on the information of the current UI interface 19 and the one or multiple gaze points of the user; execute step 350.

Step 350: determine whether the specific UI element is triggered based on the one or multiple gaze points of the user; if yes, execute step 360; if no, execute step 310.

Step 360: perform a corresponding action associated with the specific UI element.

Step 370: acquire a performance map of the eye-tracker 20 based on the one or multiple eye images of the user; execute step 380.

Step 380: determine whether the performance level of the performance map of the eye-tracker 20 is higher than a first threshold; if yes, execute step 400; if no execute step 390.

Step 390: determine whether the performance level of the performance of the eye-tracker 20 is higher than a second threshold; if yes execute step 410; if no execute step 420.

Step 400: keep current UI parameters; execute step 310.

Step 410: adjust at least one UI parameter based on the performance map of the eye-tracker 20; execute step 310.

Step 420: inform the user to perform other actions.

In the optical system 100, the sensor module 26 in the eye tracker 20 includes at least one image sensor (eye sensor) which is configured to capture one or multiple eye images of the user in step 310. The processor 22 in the eye tracker 20 is configured to receive the one or multiple eye images captured by the sensor module 26 and compute the one or multiple gaze points of the user in step 320. In addition, the processor 22 in the eye tracker 20 may further compute other eye-tracking related information based on the one or multiple eye images of the user, such as the confidence and the accuracy of estimated gaze point, the eyeball location in 3D coordinate and pupil-related information (e.g., size). The algorithms for eye-tracking operation may be implemented as, but not limited to, a process/software/firmware executed on the processor 26 of the eye tracker 20.

In the optical system 200, the sensor module 26 in the eye tracker 20 includes at least one image sensor (eye sensor) which is configured to capture the one or multiple eye images of the user in step 310. The processor 12 may receive the one or multiple eye images captured by the sensor module 26 of the eye-tracker 20 and compute the one or multiple gaze points of the user in step 320. In addition, the processor 12 may further compute other eye-tracking related information based on the one or multiple eye images of the user, such as the confidence and the accuracy of estimated gaze point, the eyeball location in 3D coordinate and pupil-related information (e.g., size). The algorithms for eye-tracking operation may be implemented as, but not limited to, a process/software/firmware executed on the processor 12 of the optical system 200.

In the optical systems 100 and 200, the sensor module 16 may include at least one scene sensor configured to capture the one or multiple images of the user's field of view, at least one audio sensor (such as a microphone) configured to receive the audio signal from the user, and/or at least one motion sensor (such as a gyro and/or an accelerometer) configured to detect the motion of the user (especially the head movement).

In the optical systems 100 and 200, the illumination module 24 may include one or multiple infrared light-emitting diodes (LEDs) for illuminating the eyes of the user in order to guarantee the necessary contrast between the iris and the pupil regardless of the eye color, particularly in a very dark or bright background, thereby increasing the accuracy of the sensor module 26 in the eye tracker 20 when registering the light reflected by the user eyes. However, the implementation of the illumination module 24 does not limit the scope of the present invention.

In the optical systems 100 and 200, the user interface 19 containing a virtual field of view and one or multiple UI elements $UIE_1$-$UIE_N$ may be presented on the display 14, wherein N is a positive integer. In an embodiment, the UI elements $UIE_1$-$UIE_N$ may be visual information presented on the display 14. In another embodiment, each of the UI elements $UIE_1$-$UIE_N$ may be an abstract element which is invisible to the user. If a UI element is configured to interact with the user, it may further be connected with an event handler which is associated with a specific operation of the optical system 100 or 200 and is handled by the processor 12. The appearance and function of the user interface and the contained UI elements may be dynamically adjusted according to the status of the eye-tracker 20 in order to optimize the user experience.

The UI elements $UIE_1$-$UIE_N$ are configured to add interactivity to the user interface 19 and provide touch points for the user's gaze. Each UI element may be associated with, but not limited to, input control, navigation control, and information display. Each UI element includes a graphic element and a hit box. The graphic element determines the appearance of the UI element and may be associated with the function of the UI element. In an embodiment, the graphic element of a UI element may be a checkbox, a radio button, a dropdown lists, a list box, a toggle button, toggles, or a date/time picker for input control. In another embodiment, the graphic element of a UI element may be a breadcrumb, a slider, a pagination, a slider, an icon, or an image carousel for navigation control In yet another embodiment, the graphic element of a UI element may be a tooltip, a progress bar, a notification, a message box, or a modal window for information display. However, the appearance of the graphic element in each UI element does not limit the scope of the present invention.

The hit box of a UI element is a virtual element which is invisible to the user and is connected to a corresponding event handler. When a gaze command associated with the one or multiple gaze points of the user triggers the hit box of a UI element, a predetermined action associated with the UI element may be performed. When one or multiple trigger conditions are satisfied, the UI element is triggered by the gaze command. Exemplary trigger conditions include, but not limited to, when the user's gaze is located within the hit box and the user also sends a response from the I/O device 18 or the sensors (i.e., microphone) to confirm the selection, the duration of user's gaze located within the hit box is longer than a specific fixation duration, the user's gaze is located within the hit box and the user sends a response in the form of a voluntary eye movement event (e.g., voluntary saccade, blink, etc.) to confirm the selection immediately or within a specific time interval, and the user's gaze trajectory crosses the response boundary of the hit box. However, the type of the trigger conditions associated with each UI element does not limit the scope of the present invention.

In the optical system 100 or 200, the I/O device 18 is configured to receive the command from the user. In an embodiment, the I/O device 18 may include any type of handed controller (such as a game pad or a game console) and/or any form of haptic device (such as a suit or a glove). The I/O device 18 is configured to detect and transfer the user's motion signal to the processor 12 of the optical system 100 or 200. In an embodiment, the processor 12 may control the operation of the optical system 100 or 200 based solely on the user command received by the I/O device 18. In another embodiment, the processor 12 may control the operation of the optical system 100 or 200 based on both the user commands received by the I/O device 18 and the gaze commands received by the UI elements $UIE_1$-$UIE_N$ of the user interface 19.

Figure 4:
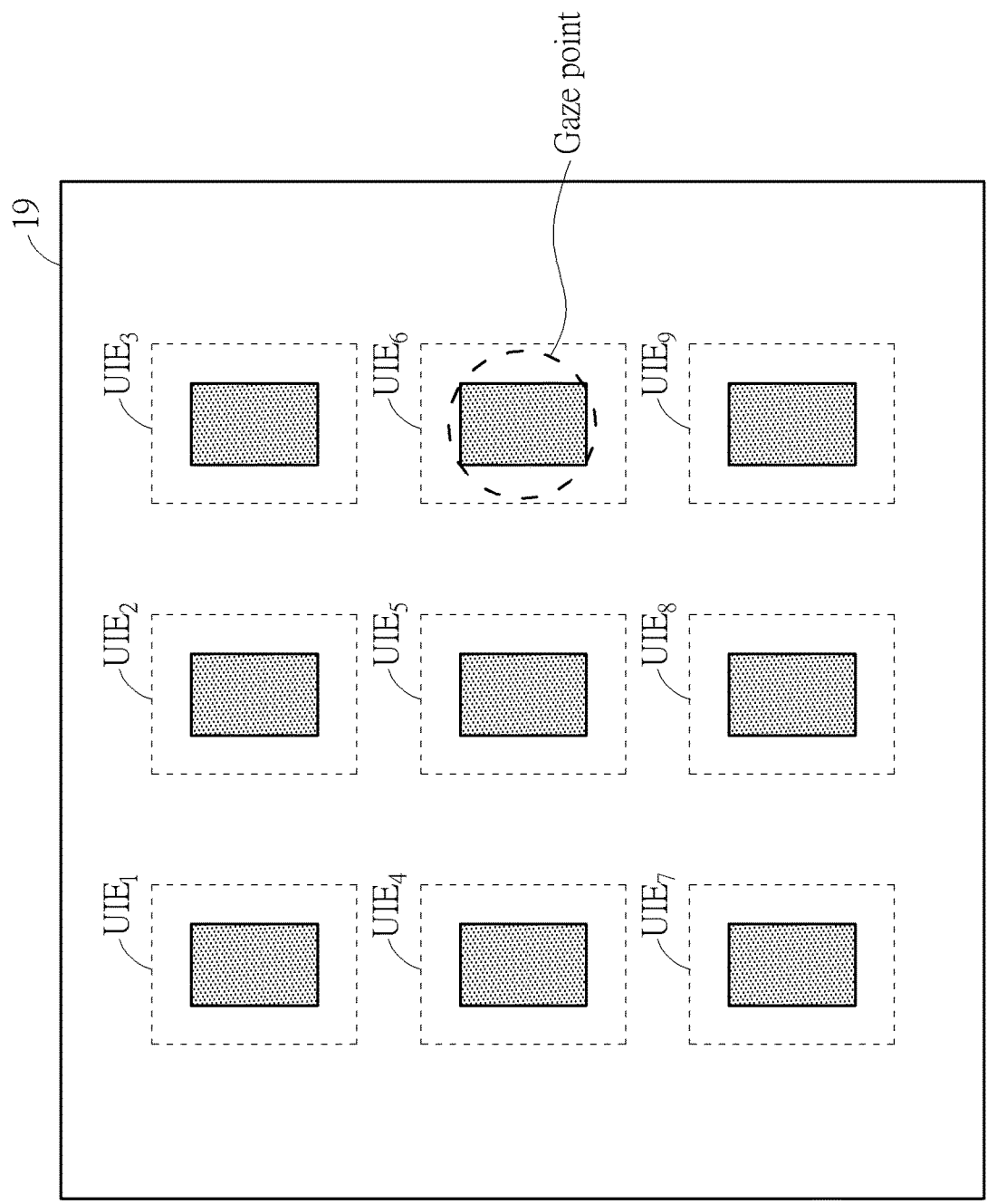
FIG. 4 is a diagram illustrating a user interface presented during an eye-tracking operation of the optical system according to an embodiment of the present invention.

In step 330, the processor 12 is configured to provide the user interface which includes one or multiple UI elements based on the one or multiple gaze points of the user. In another embodiment, the processor 12 may further take the one or multiple images of the field of view of the user and the motion of the user into consideration when providing the user interface. FIG. 4 is a diagram illustrating the user interface 19 presented during an eye-tracking operation of the optical systems 100 and 200 according to an embodiment of the present invention. The information of the current UI interface 19 includes the current layout of the UI elements $UIE_1$-$UIE_N$. For illustrative purpose, FIG. 4 depicts the embodiment of N=9, wherein the UI elements $UIE_1$-$UIE_9$ are arranged in an array. However, the number and the locations of the UI elements $UIE_1$-$UIE_9$ do not limit the scope of the present invention.

In step 340, the processor 12 is configured to identify the specific UI element which the user interacts with based on the information of the current UI interface 19 and the one or multiple gaze points of the user. The information of the current UI interface 19 includes the current layout of the UI elements $UIE_1$-$UIE_N$, such as the UI elements $UIE_1$-$UIE_9$ depicted in FIG. 4. If the one or multiple gaze points of the user calculated in step 320 is located on the UI element $UIE_6$, it is determined that the user may be interacting with the UI element $UIE_6$ using a gaze command.

In step 350, the processor 12 is configured to determine whether the specific UI element is triggered based on the one or multiple gaze points of the user. The hit box of the specific UI element is triggered by the gaze command of the user when one or multiple predefined trigger conditions are satisfied. The above-mentioned predefined trigger conditions may include, but not limited to, user's gaze fixed longer than the fixation duration of the specific UI element, another button being pressed, a voice command being issued, intentional user blinks, or certain gaze path/pattern being detected.

In step 360, a corresponding action associated with the specific UI element is performed if it is determined that the specific UI element is triggered based on the one or multiple gaze points of the user. The above-mentioned predefined actions may include, but not limited to, content selection, previous, next, setting, close, back, home, show notification and lock screen.

In step 370, the processor 12 is configured to acquire the performance map of the eye-tracker 20 based on the one or multiple eye images of the user and an initial field of view of the user. The performance map represents the performance of the eye-tracking operation of the eye-tracker 20 relative to the initial field of view of the user which is the field of view of the user when the user looks straight ahead. Since the eye tracker 20 is disposed at a fixed location in the sensor module 26 which the user may put on, the sensor module 26 only moves with the user's head movement, but the user's eye movement does not influence the location of the sensor module 26. Thus, the performance map may vary with the user's head motion, but is independent of the user's eye movement.

Figure 5:
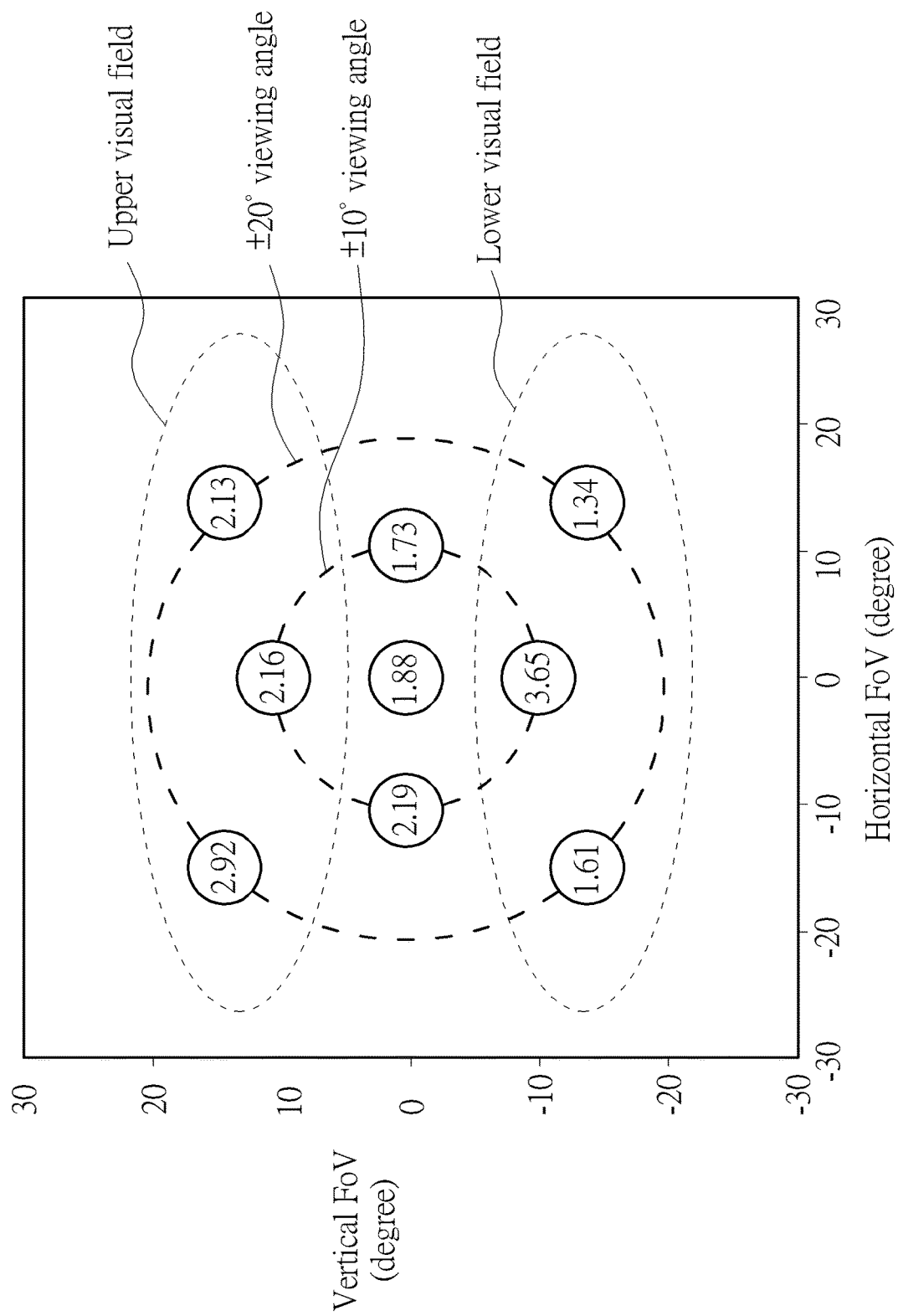
FIG. 5 is a diagram illustrating a performance map of an eye-tracker according to an embodiment of the present invention.

FIG. 5 is a diagram illustrating the performance map of the eye-tracker 20 acquired in step 370 according to an embodiment of the present invention. The vertical axis represents the vertical FoV of the user in degrees, the horizontal axis represents the horizontal FoV of the user in degrees, and the numbers represent the error rate of the eye-tracker 20 at different locations in the FoV of the user. Typically speaking, the accuracy of the eye-tracker 20 decreases as the eccentricity increases. As depicted in FIG. 5, the average error rate of the eye-tracker 20 is 1.88° in the center of the FoV, the average error rate of the eye-tracker 20 is around 1.96° within ±10° viewing angle of the FoV, and the average error rate of the eye-tracker 20 is around 2° within ±20° viewing angle of the FoV.

The performance map acquired in step 370 may have the default values depicted in FIG. 5 at first use and then dynamically updated during the application of the optical systems 100 and 200. In an embodiment, the default values of the performance map may be adjusted by the user based on personal factors such as the visual acuity and the preference of the user. For example, if the user has difficulty in fixating the items on the right side due to lower acuity in the right visual field, the average error rate of the eye-tracker 20 in the right visual field of the FoV may be manually increased.

In another embodiment, the default values of the performance map may be adjusted automatically based on the relationship between the user and the architecture of the optical system. For example, the accuracy of the eye-tracker 20 may also be a function of the distance between the user's eye and the sensor module 26 of the eye-tracker 20. For illustrative purpose, it is assumed that the sensor module 26 of the eye-tracker 20 is disposed below the center of the FoV of the user. With the same amount of the eye/head rotation along the vertical direction, the accuracy of the eye-tracker 20 is higher when the user looks down than when the user looks up. As depicted in FIG. 5, the average error rate of the eye-tracker 20 is around 1.55° in the lower visual field of the FoV, and the average error rate of the eye-tracker 20 is around 2.44° in the upper visual field of the FoV.

In an embodiment, the performance map of the eye-tracker 20 may be a single map which may be constructed based on a single performance parameter of the eye-tracker 20, such as based on the accuracy, the confidence, the stability/precision or the sample rate of the eye tracking operation. In another embodiment, the performance map of the eye-tracker 20 may be constructed based on a plurality of performance parameters of the eye-tracker 20, such as based on at least two parameters among the accuracy, the confidence, the stability/precision and the sample rate of the eye tracking operation. When multiple performance parameters of the eye-tracker 20 are adopted, each performance parameter may have a specific weighting for constructing the performance map, wherein the weighting of each performance parameter may be determined by the optical systems 100 and 200 automatically, by the user based on personal preference or depending on the type of the current application.

In another embodiment, the performance map of the eye-tracker 20 may be a list of maps each including at least one sub-map. The sub-map is constructed based on a single performance parameter of the eye-tracker 20, such as based on the accuracy, the confidence, the stability/precision or the sample rate of the eye tracking operation.

The confidence of the eye tracker 20 refers the confidence of estimating the gaze points of the user. The eye-tracker 20 can derive the eyeball center information based on the one or multiple eye images of the user. With the eyeball center location, the possible location and shape of the projected pupil in the image plane may be predicted and limited to a small parameter space. If the pupil image acquired by the sensor module 26 is out of range, the confidence and the accuracy of the sensor module 26 is deemed low.

Figure 6B:
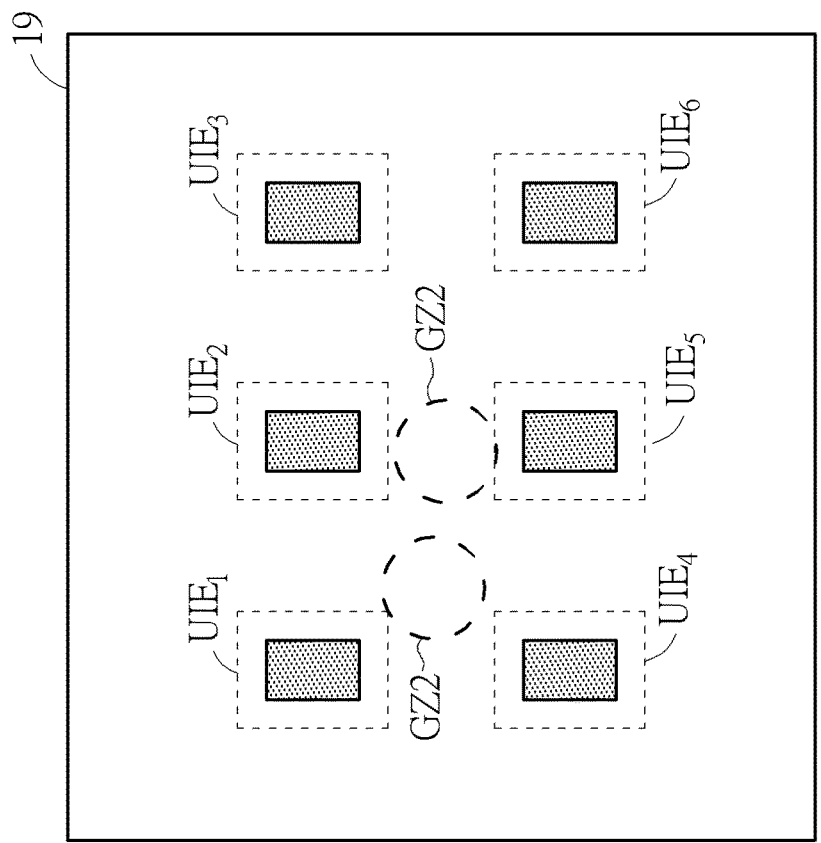
FIGS. 6A and 6B are diagrams illustrating a method of evaluating the confidence level of the performance of the eye-tracker according to an embodiment of the present invention.
Figure 6A:
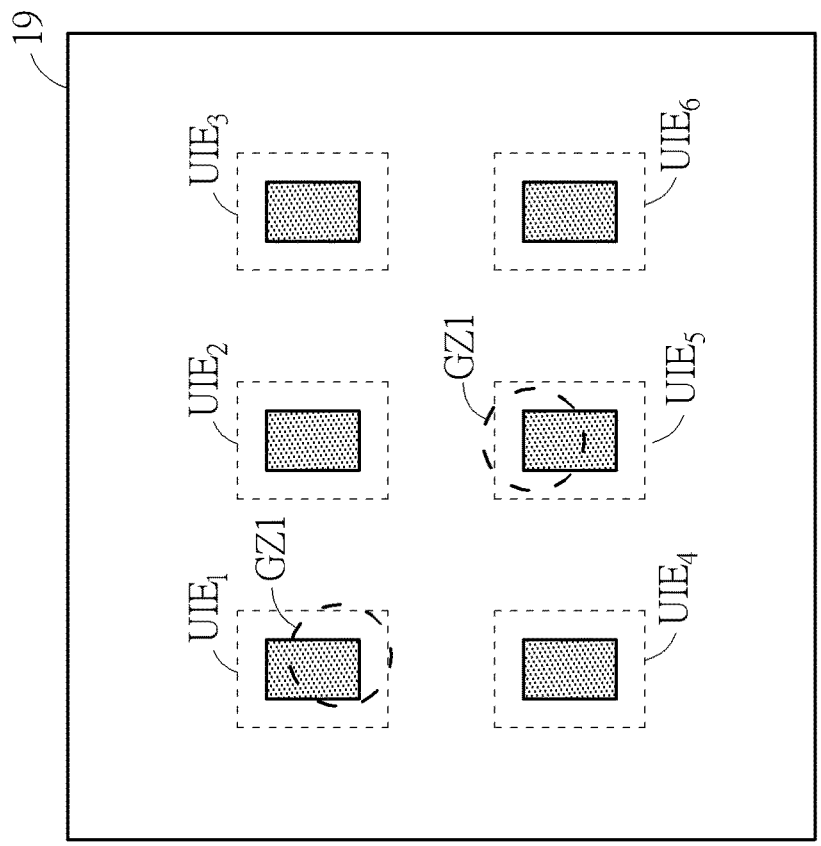

FIGS. 6A and 6B are diagrams illustrating a method of evaluating the confidence level of the performance of the eye-tracker 20 according to an embodiment of the present invention. In FIG. 6A, the confidence or the accuracy of the sensor module 26 is deemed high when a large portion of each gaze points GZ1 of the user is mostly overlapped with a UI element. In FIG. 6B, the confidence or the accuracy of the sensor module 26 is deemed low when a large portion of each gaze point GZ2 of the user is not mostly overlapped with a UI element.

In another embodiment, the sensor module 26 in the eye-tracker 20 may further include at least one inertial sensor configured to detect a slippage which changes the relationship between the user's eyes and the eye sensor in the sensor module 26 of the eye-tracker 20. For example, the confidence or the accuracy of the sensor module 26 is deemed low if the actual position of the pupil differs from the position of predicted pupil based on the data captured by the eye sensor and the inertial sensor.

In the step 380 and 390, the performance level of the eye tracker 20 at the location of the specific UI element is evaluated. In an embodiment when the performance map of the eye tracker is a single map, the evaluation may be implemented as a comparison between the performance level of the eye tracker 20 and the first threshold as well as a second threshold. In another embodiment when the performance map of the eye tracker includes multiple sub-maps, the first threshold and the second threshold may also be a list containing multiple values corresponding to each sub-map. The performance level derived from each sub-map may be evaluated separately. To reduce the complexity of the comparison, the performance level subject to the comparison may be transformed into an abstract scale wherein a higher value on the abstract scale corresponds to better performance of the eye tracker 20.

If it is determined in step 380 that the performance level of the eye-tracker 20 at the location of the specific UI element is higher than the first threshold, step 400 is then executed for keeping the current setting of the UI parameters.

If it is determined in steps 380 and 390 that the confidence level of the performance of the eye-tracker 20 at the location of the specific UI element is between the first threshold and the second threshold, step 410 is executed for adjusting the setting of at least one UI parameter based on the performance map of the eye-tracker 20.

In an embodiment, the setting of a UI element may be adjusted by altering the size of its hit box, the size of its graphic element and/or the fixation duration for triggering its hit box. As previously stated, the hit box is a virtual element that waits for a certain trigger event from the user, the graphic elements is the part of the UI element that can be seen by the user, and the fixation duration is the minimum time the user's gaze is required to fixate at the hit box for triggering the hit box. When the specific UI element is located at a position corresponding to a lower performance level (such as lower accuracy, lower confidence or lower sample rate) in the performance map, the size of its hit box may be enlarged so that the user's gaze can be located within the hit box of the specific UI element more easily, the size of its graphic element may be reduced so that it is more likely for the user's gaze to be located within the hit box of the specific UI element, and/or the fixation duration of its hit box may be increased for preventing unintentional triggers of the hit box, especially when the sample rate of the eye tracker 20 is low at the position.

FIGS. 7A-7B, 8A-8B and 9A-9B are diagrams illustrating methods of adjusting the setting of at least one UI element in step 410 according to embodiments of the present invention. For illustrated purpose, it is assumed that the UI elements $UIE_1$-$UIE_3$ are provided within the FoV of the user 30 and the location of each UI element is independent of the user's head motion. When the user 30 looks directly ahead, the UI elements $UIE_1$ and $UIE_3$ are provided within the peripheral FoV of the user 30, and the UI element $UIE_2$ is provided within the central FoV of the user 30, as depicted in FIG. 7A. When the user 30 looks towards his right side and rotates his head accordingly, the UI elements $UIE_1$ and $UIE_2$ are provided within the peripheral FoV of the user 30, and the UI element $UIE_3$ is provided within the central FoV of the user 30, as depicted in FIG. 7B. As the one or multiple sensors in the sensor modules 16 and 26 detect the head/eye movement of the user 30, the performance map of the eye-tracker 20 may be updated based on the location of the new gaze point, and the correspondence between the user's FoV and the user interface 19 may also be updated based on the user's head motion. As previously stated, the accuracy of the eye-tracker 20 is higher within the central FoV (smaller eccentricity) than within the peripheral FoV (larger eccentricity) of the user 30, the UI elements $UIE_1$-$UIE_3$ may be dynamically adjusted according to the head/eye movement of the user 30. For example, each UI element within the peripheral FoV of the user 30 may have a larger hit box (represent by dotted square) due to lower accuracy of the eye-tracker 20 in the peripheral FoV, as depicted in FIGS. 7A and 7B; each UI element within the peripheral FoV of the user 30 may have a smaller graphic element (represent by shaded square) due to lower accuracy of the eye-tracker 20 in the peripheral FoV, as depicted in FIGS. 8A and 8B. In the cases when the sample rate of the eye tracker 20 is higher within the central FoV than within the peripheral FoV of the user 30, each UI element within the peripheral FoV of the user 30 may have a longer fixation duration due to lower accuracy of the eye-tracker 20 in the peripheral FoV, as depicted in FIGS. 9A and 9B.

Figure 10B:
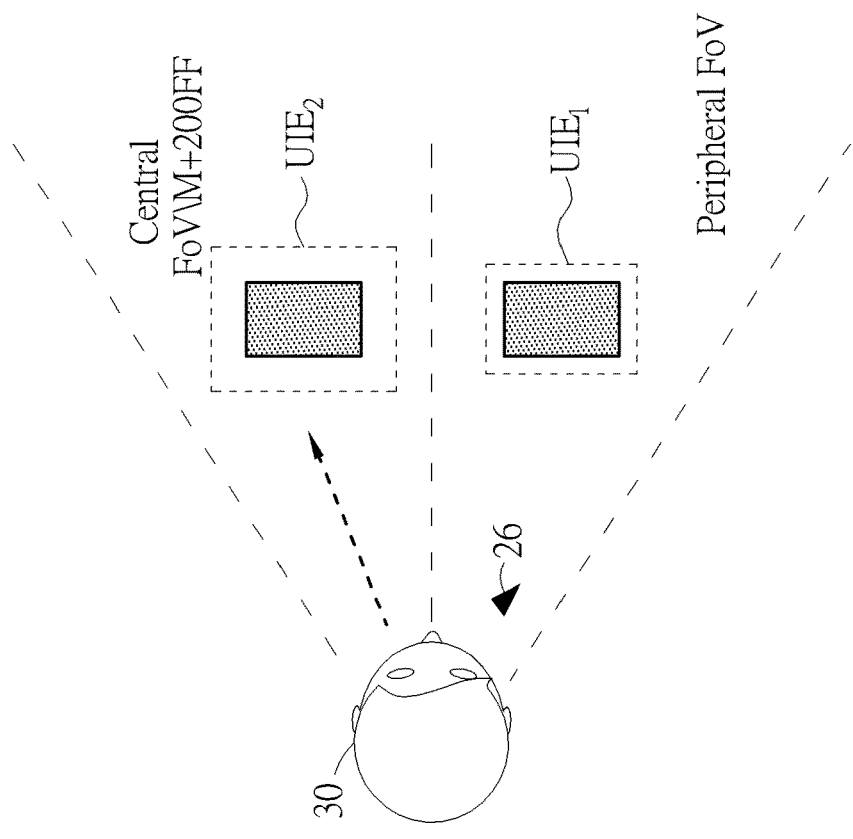
FIGS. 10A and 10B are diagrams illustrating a method of adjusting the setting of at least one UI element according to another embodiment of the present invention.
Figure 10A:
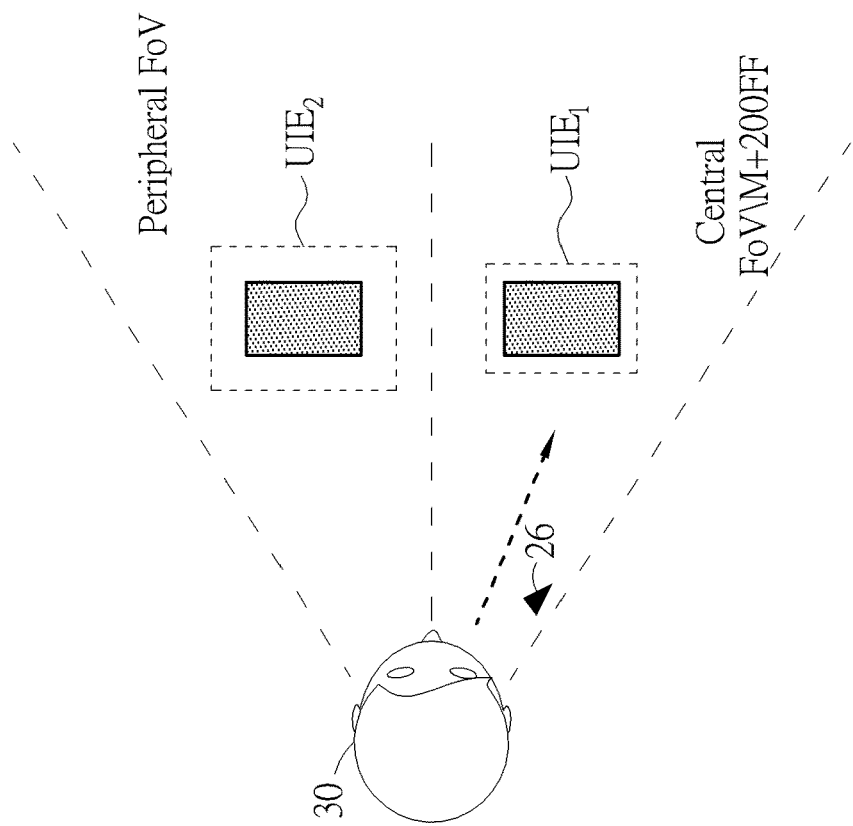
Figure 11A:
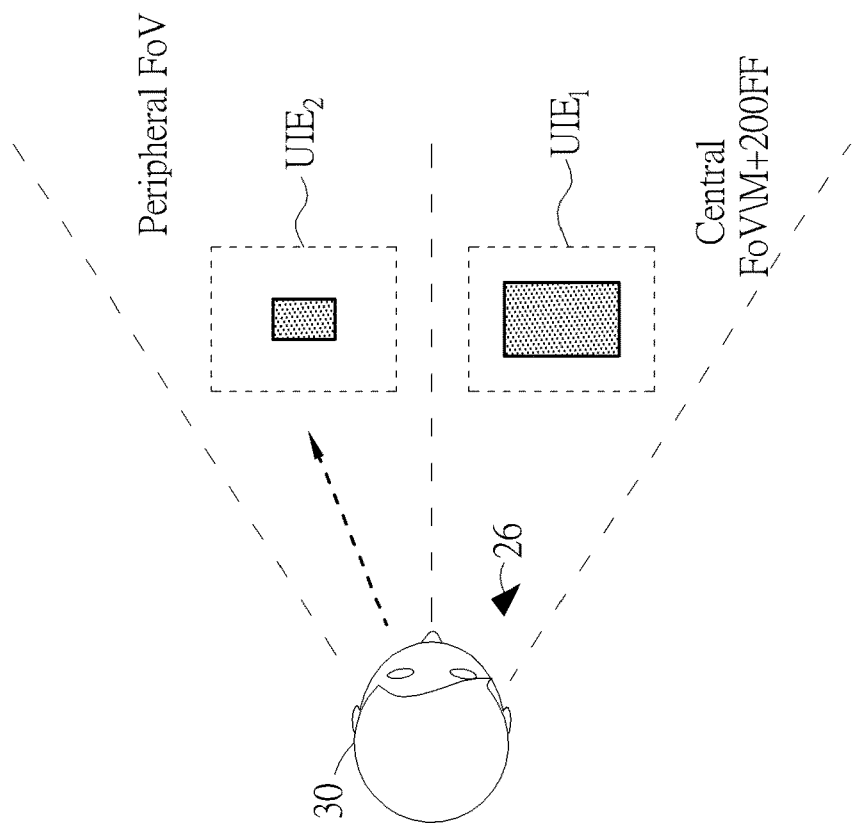
FIGS. 11A and 11B are diagrams illustrating a method of adjusting the setting of at least one UI element according to another embodiment of the present invention.
Figure 11B:
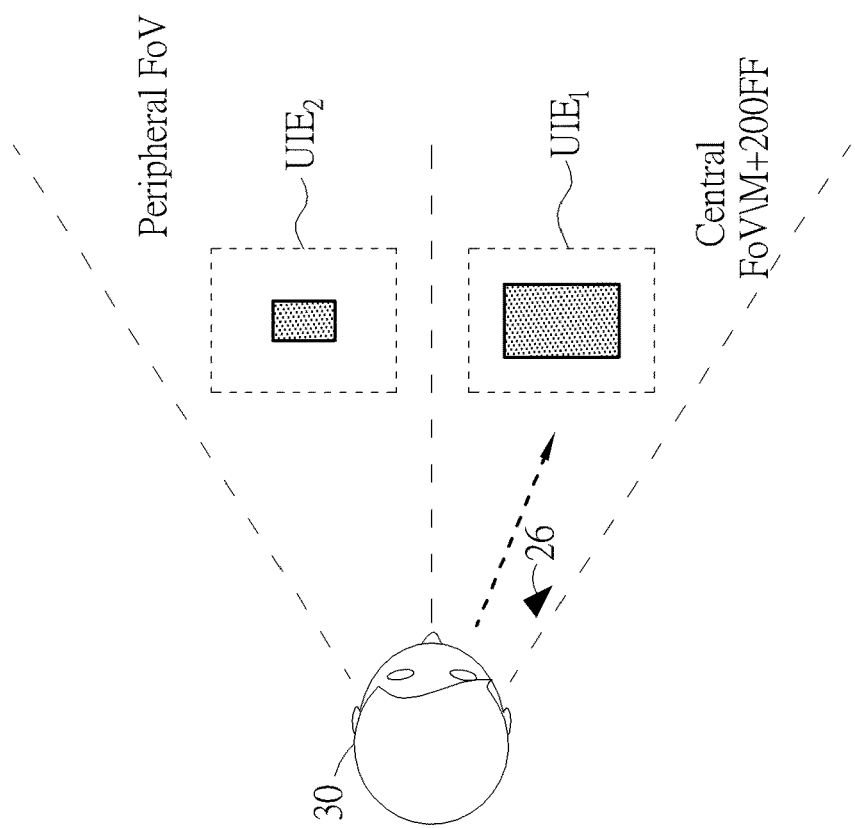

FIGS. 10A-10B and 11A-11B are diagrams illustrating methods of adjusting at least one UI element according to other embodiments of the present invention. For illustrated purpose, it is assumed that two UI elements $UIE_1$ and $UIE_2$ are provided within the FoV of the user 30. As the one or multiple sensors in the sensor modules 16 and 26 detect the head/eye movement of the user 30, the performance map of the eye-tracker 20 may be updated based on the location of the new gaze point, and the correspondence between the user's field of view and the user interface 19 may also be updated based on the user's head motion. As previously stated, the accuracy of the eye-tracker 20 may be a function of the distance between the user's eye and the sensor module 26. For example, it is assumed that the function of the distance between the user's eye and the sensor module 26 may be a linear function (i.e., the longer the distance, the lower the accuracy of the eye tracker 20) and that the sensor module 26 of the eye-tracker 20 is disposed below the center of the FoV of the user. When the user 30 directs his gaze toward the UI element $UIE_1$, the distance between the user's eye and the sensor module 26 is shortened, and the UI element $UIE_1$ may have a smaller hit box (represented by dotted square) due to higher accuracy of the eye-tracker 20 at the location of $UIE_1$, as depicted in FIG. 10A; when the user directs his gaze toward the UI element $UIE_2$, the distance between the user's eye and the sensor module 26 is extended, and the UI element $UIE_2$ may have a larger hit box (represented by dotted square) due to lower accuracy of the eye-tracker 20 in the location of $UIE_2$, as depicted in FIG. 10B; when the user 30 directs his gaze toward the UI element $UIE_1$ the distance between the user's eye and the sensor module 26 is shortened, and the UI element $UIE_1$ may have a larger graphic element (represented by shaded square) due to higher accuracy of the eye-tracker 2 at the location of $UIE_1$, as depicted in FIG. 11A; when the user 30 directs his gaze toward the UI element $UIE_2$, the distance between the user's eye and the sensor module 26 is extended, and the UI element $UIE_2$ may have a smaller graphic element (represent by shaded square) due to lower accuracy of the eye-tracker 2 at the location of $UIE_2$, as depicted in FIG. 11B.

In the embodiments depicted in FIGS. 7A-11A and 7B-11B, the difference between a first UI element corresponding to a low accuracy value of the performance map and a second UI element corresponds to a high accuracy value of the performance map may be achieved by adjusting the first UI element only, adjusting the second UI element only or adjusting both the first UI element and the second UI element.

Once the setting of the UI elements is adjusted, the arrangement of the UI elements may also be adjusted to be adapted to the adjustment of each UI element in order to prevent the UI elements from overlapping with each other. FIGS. 12A-12B and FIGS. 13A-13B are diagrams illustrating methods of adjusting the arrangement of multiple UI elements $UIE_1$-$UIE_N$ according to the embodiments of the present invention. For illustrated purpose, FIGS. 12A-12B and 13A-13B depict the embodiment of N=6, wherein the UI elements $UIE_1$-$UIE_6$ are arranged in a matrix.

Figure 12B:
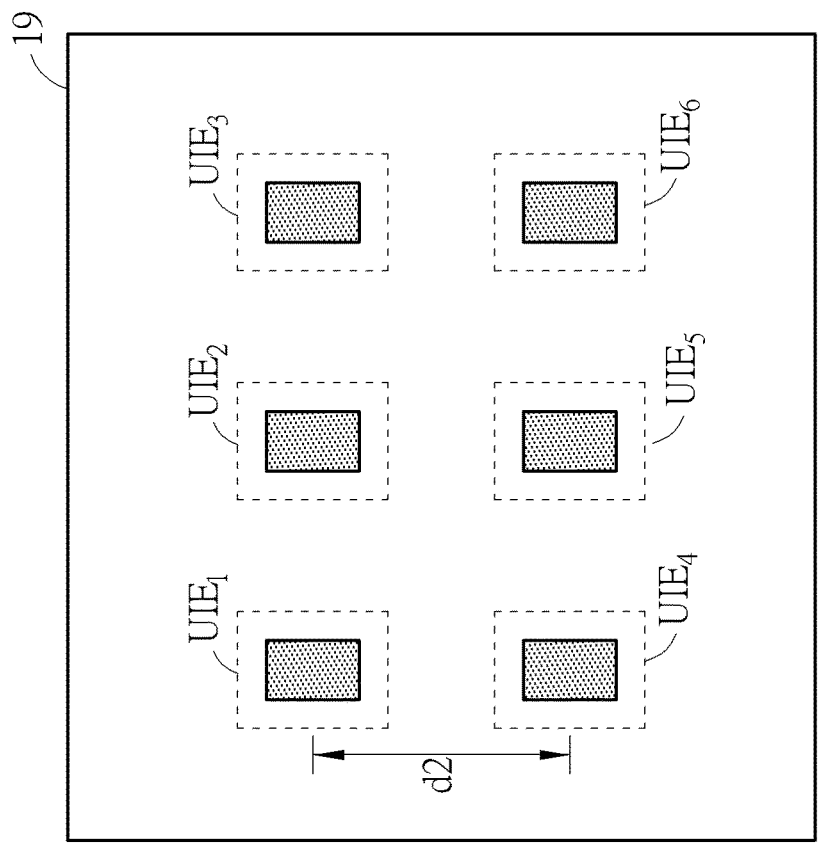
FIGS. 12A and 12B are diagrams illustrating a method of adjusting multiple UI elements according to an embodiment of the present invention.
Figure 12A:
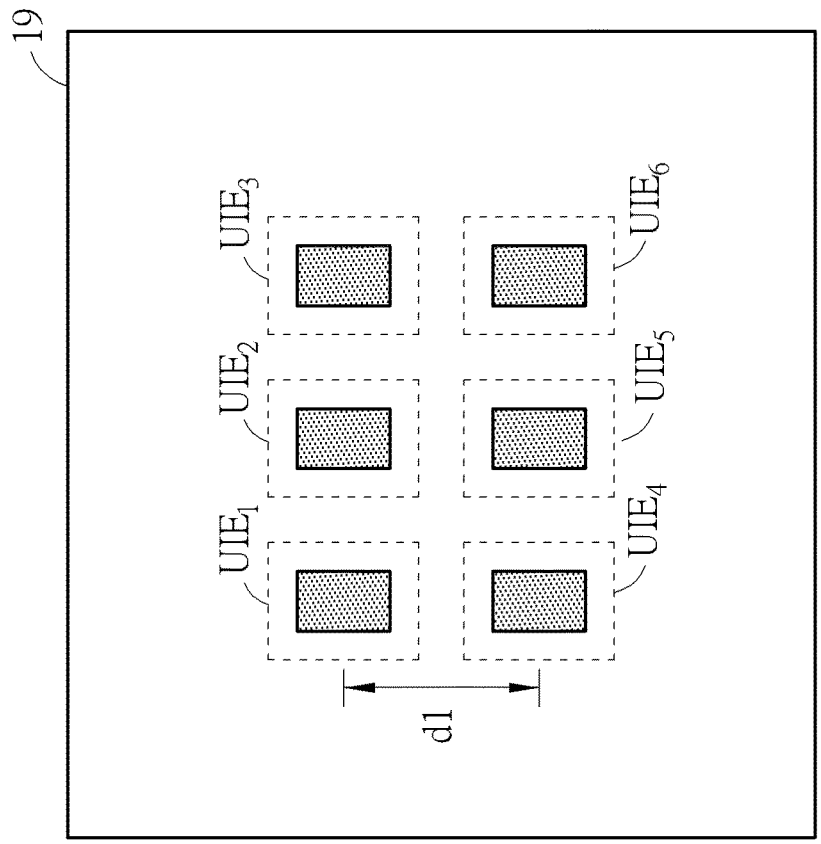

In FIG. 12A, the UI elements $UIE_1$-$UIE_6$ are located within a region corresponding to a higher accuracy value in the performance map. In FIG. 12B, the same UI elements $UIE_1$-$UIE_6$ are located within a region corresponding to a lower accuracy value in the performance map. The distance d2 between each UI element in FIG. 12B may be larger than the distance d1 between each UI element in FIG. 12A so as to prevent the UI elements from overlapping with each other due to the adjustment of the UI elements (e.g., enlarge the hit box and/or reduce the size of the graphic element).

Figure 13B:
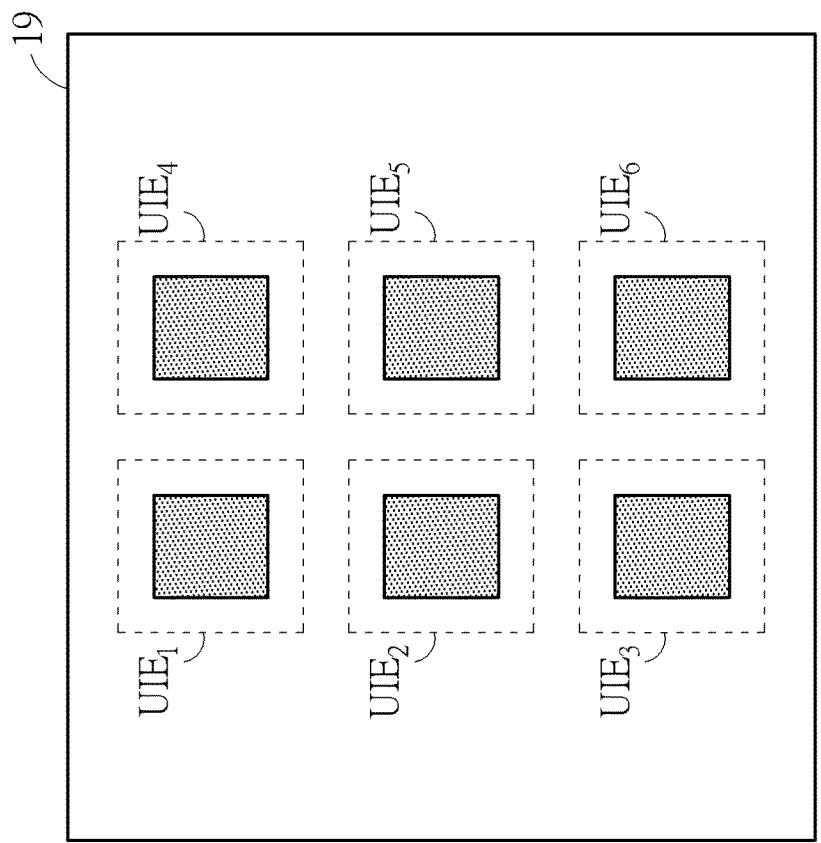
FIGS. 13A and 13B are diagrams illustrating a method of adjusting multiple UI elements according to another embodiment of the present invention.
Figure 13A:
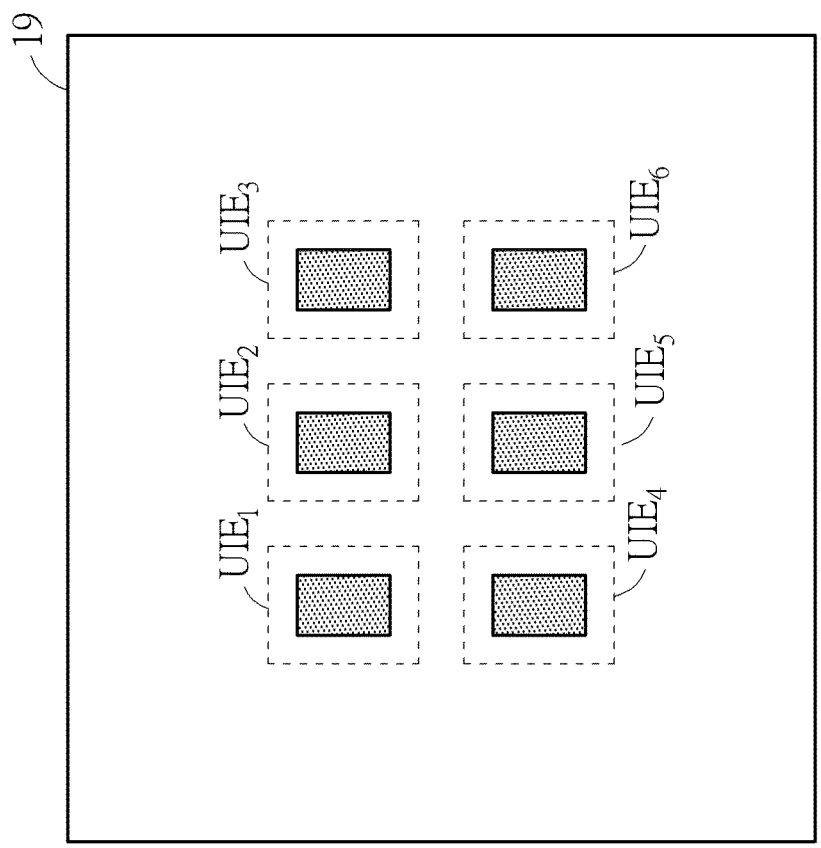

In FIG. 13A, the UI elements $UIE_1$-$UIE_6$ are located within a region corresponding to a higher accuracy value in the performance map. In FIG. 13B, the UI elements $UIE_1$-$UIE_6$ are located within a region corresponding to a lower accuracy value in the performance map. The number of columns/rows in the matrix and the size of each UI element in FIG. 13B may be altered so that more space may be used to present the UI element which in turn reduces the possibility that the UI elements are overlapped with each other.

Although, the alteration of the UI elements may be an adequate way to maintain the user experience most of the time, it is not the case when the performance of the eye-tracker 20 is too low. In the present invention, the second threshold, smaller than the first threshold, is defined as the minimum value required for performing proper eye-tracking operation. If it is determined in steps 380 and 390 that the performance level of the eye-tracker 20 is not higher than the first threshold and the second threshold, step 420 is executed for informing the user of the low performance of the eye-tracker.

FIGS. 14A-14D are diagrams illustrating methods of informing the user of the low performance of the eye-tracker 20 according to embodiments of the present invention. For illustrated purpose, FIGS. 14A-14D depict the embodiment of N=6, wherein the UI elements $UIE_1$-$UIE_6$ are arranged in a matrix.

Figure 14B:
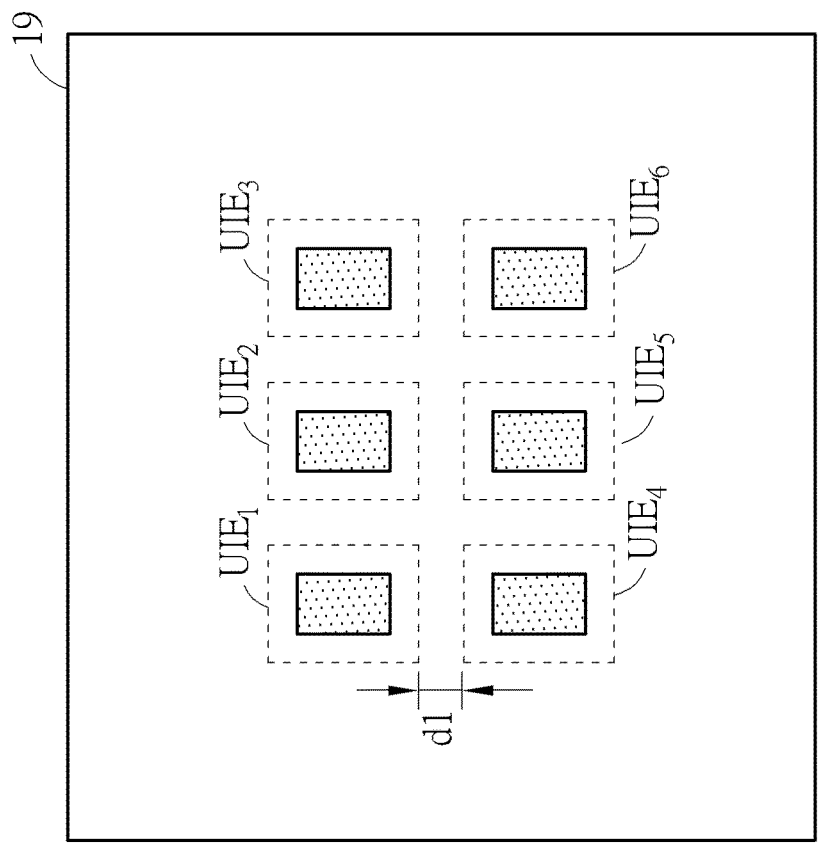
FIGS. 14A-14D are diagrams illustrating methods of informing the user of the low performance of the eye-tracker according to embodiments of the present invention.
Figure 14A:
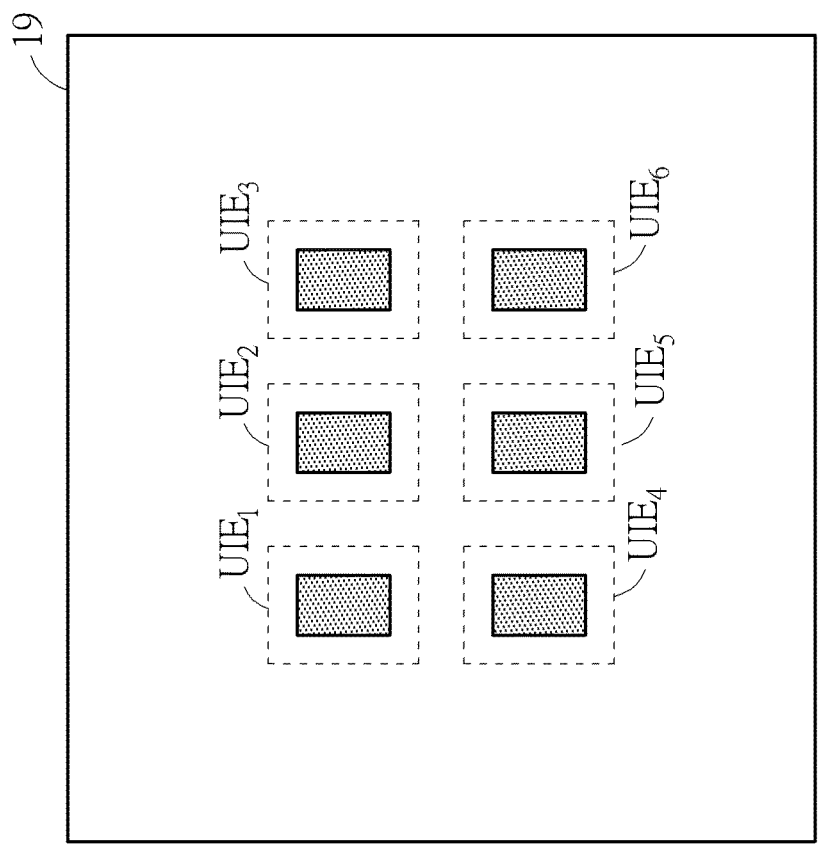

FIG. 14A depicts the UI elements $UIE_1$-$UIE_6$ of the user interface 19 when determining that the confidence level of the performance map of the eye-tracker 20 is higher than the first threshold and the second threshold.

When the performance of the eye-tracker 20 is deemed too low, the appearance of each UI element may be altered (such as changing color, faded out, glowing or flashing) for indicating that the feedback reaction when the user's gaze overlaps with each UI element has been deactivated, as depicted in FIG. 14B.

Figure 14D:
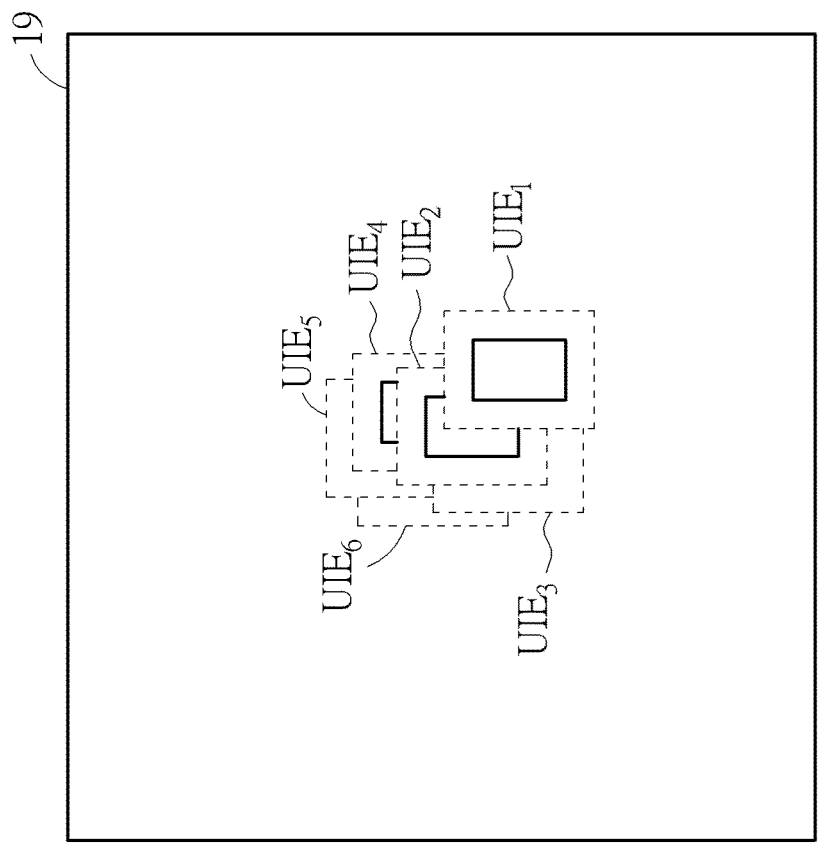
Figure 14C:
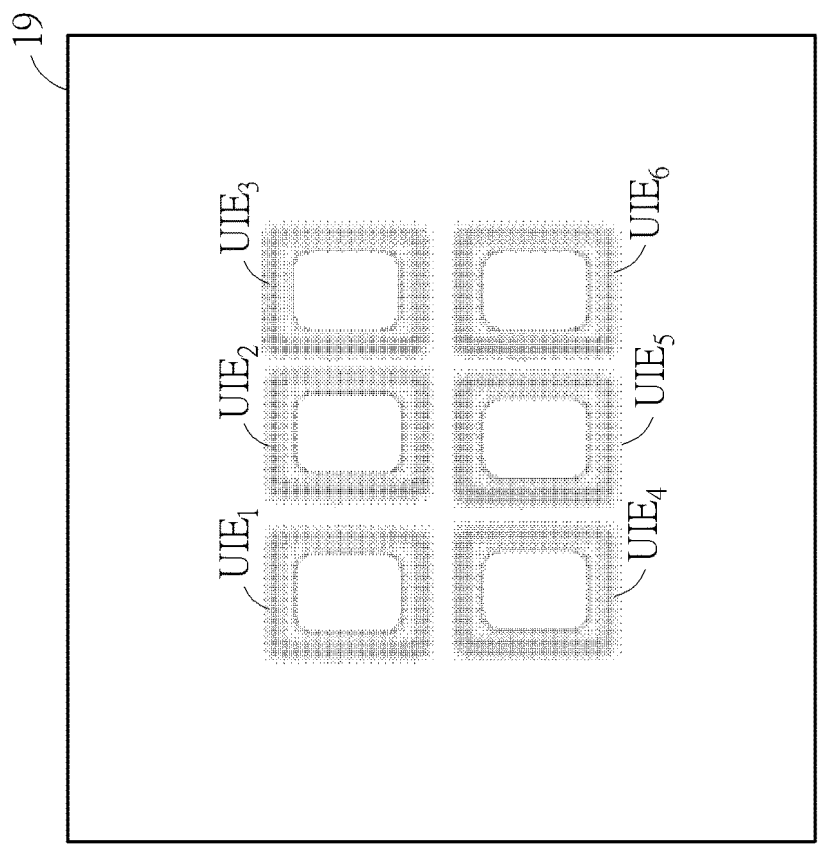

When the performance of the eye-tracker 20 is deemed too low, each UI element may be blurred for indicating that the feedback reaction when the user's gaze overlaps with each UI element has been deactivated, as depicted in FIG. 14C.

When the performance of the eye-tracker 20 is deemed too low, the location of each element may be randomized for indicating that the feedback reaction when the user's gaze overlaps with each UI element has been deactivated, as depicted in FIG. 14D.

In an embodiment, the processor 12 may further deactivate the gaze-based interaction and switch to another type of interaction (e.g., I/O device-based interaction) after informing the user of the low performance of the eye-tracker 20. In another embodiment, the processor 12 may further request the user to re-calibrate the eye-tracker 20 after informing the user of the low performance of the eye-tracker 20.

In the present invention, one or multiple UI elements are provided on the user interface for providing gaze-based user interactions. The one or multiple UI elements may be adjusted dynamically based on the performance map of the eye-tracker/operation. Therefore, the present invention can provide an optical system and a related method for improving user experience and the accuracy of gaze-based interaction.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical system which improves user experience and accuracy of gaze-based interaction, comprising:
   an eye-tracker, comprising:
      a first sensor module configured to capture one or multiple eye images of a user; and
      a first processor configured to:
         receive the one or more eye images captured by the first sensor module; and
         sample a position of the user's eye by computing one or more gaze points of the user based on the one or more eye images;
   a head-mounted display, comprising:
      a second processor configured to:
         provide a user interface which contains one or multiple UI elements based on one or multiple gaze points of the user which are computed based on the one or multiple eye images;
         construct a performance map of the eye-tracker according to a confidence and a sample rate of the eye-tracker acquired based on the one or multiple eye images of the user for representing performance of the eye-tracker relative to an initial field of view of the user when the user looks straight ahead, wherein:
            the sample rate refers to how many times per unit time the eye-tracker samples the position of the user's eyes;
            the performance map of the eye-tracker includes a plurality of default values respectively corresponding to a plurality of locations within the initial field of view of the user;
            each default value of the performance map is adjusted before an operation of the eye-tracer based on a personal factor of the user or based on a distance between the user's eye and the first sensor module; and
            each default value of the performance map is updated during an operation of the eye-tracer;
         evaluate a performance level of the eye tracker at a location of at least one UI element among the one or multiple UI elements of the user interface based on the performance map; and
         adjust the at least one UI element based on a result of evaluating the performance level of the eye-tracker; and
   a display configured to present the user interface.

2. The optical system of claim 1, wherein:
the second processor is further configured to receive the one or more gaze points of the user from the first processor.

3. The optical system of claim 2, wherein:
the second processor is further configured to perform a corresponding action associated with the at least one UI element when the one or more gaze points of the user trigger the at least one UI element.

4. The optical system of claim 1, wherein:
each UI element includes a graphic element and a hit box; and
the second processor is further configured to adjust the at least one UI element of the user interface by adjusting a size of a corresponding graphic element, adjusting a size of a corresponding hit box, and/or adjusting a fixation duration of the corresponding hit box based on the performance map of the eye-tracker.

5. The optical system of claim 1, wherein the second processor is further configured to adjust the multiple UI elements of the user interface by adjusting a distance between two adjacent UI elements, adjusting a layout of the multiple UI elements, and/or adjusting a size of each UI element.

6. The optical system of claim 1, wherein the second processor is further configured to:
   identify a specific UI element among the one or multiple UI elements of the user interface which the user interacts with based on information of the UI interface and the one or multiple gaze points of the user;
   determine whether the specific UI element is triggered by a gaze command associated with the one or multiple gaze points of the user; and
   perform a corresponding action associated with the specific UI element when the specific UI element is triggered by the gaze command.

7. The optical system of claim 6, wherein:
each UI element includes a graphic element and a hit box; and
the second processor is further configured to:
   increase a size of the graphic element, reduce a size of the hit box, and reduce a fixation duration of the hit box when the specific UI element corresponds to a high performance level of the performance map of the eye-tracker; or
   reduce the size of the graphic element, increase the size of the hit box, and increase the fixation duration of the hit box when the specific UI element corresponds to a low performance level of the performance map of the eye-tracker.

8. The optical system of claim 6, wherein the second processor is further configured to increase a distance between the specific UI element and an adjacent UI element among the multiple UI elements, rearrange the multiple UI elements so as to occupy a larger region of the UI interface when the multiple UI elements correspond to a low performance level of the performance map of the eye-tracker.

9. The optical system of claim 1, wherein the second processor is further configured to:
  determine whether the performance level of the performance map of the eye-tracker is higher than a first threshold;
  determine whether the performance level of the performance map of the eye-tracker is higher than a second threshold which is lower than the first threshold; and
  adjust the at least one UI element of the user interface based on the performance map of the eye-tracker when determining that the performance level of the eye-tracker is between the first threshold and the second threshold.

10. The optical system of claim 9, wherein the second processor is further configured to:
  inform the user of a low performance of the eye-tracker when determining that the performance level of the eye-tracker is not higher than the second threshold.

11. The optical system of claim 10, wherein the second processor is further configured to:
  deactivate a gaze-based interaction of each UI element and/or request the user to re-calibrate the eye-tracker after informing the user of the low performance of the eye-tracker.

12. The optical system of claim 1, wherein the second processor is further configured to:
  construct the performance map of the eye-tracker according to an accuracy, a stability, or a precision of the eye-tracker acquired based on the one or multiple eye images of the user.

13. A method of improving user experience and accuracy of gaze-based interaction, comprising:
  capturing one or multiple eye images of a user during an eye-tracking operation;
  sampling a position of the user's eye by computing one or multiple gaze points of the user based on the one or multiple eye images of the user;
  providing a user interface containing one or multiple UI elements based on the one or multiple gaze points of the user;
  constructing a performance map of the eye-tracking operation according to a confidence and a sample rate of the eye-tracking operation acquired based on the one or multiple eye images of the user for representing performance of the eye-tracking operation relative to an initial field of view of the user when the user looks straight ahead, wherein:
    the sample rate refers to how many times per unit time the position of the user's eye is sampled during the eye-tracking operation;
    the performance map of the eye-tracking operation includes a plurality of default values respectively corresponding to a plurality of locations within the initial field of view of the user;
    each default value of the performance map is adjusted before the eye-tracking operation based on a personal factor of the user or based on a distance between the user's eye and the first sensor module; and
    each default value of the performance map is updated during the eye-tracking operation;
  evaluating a performance level of the eye-tracking operation at a location of at least one UI element among the one or multiple UI elements of the user interface based on the performance map; and
  adjusting at least one UI element-based on a result of evaluating the performance level of the eye-tracking operation.

14. The method of claim 13, wherein each UI element includes a graphic element and a hit box, and the method further comprising:
  adjusting the at least one UI element of the user interface by adjusting a size of a corresponding graphic element, adjusting a size of a corresponding hit box, and/or adjusting a fixation duration of the corresponding hit box based on the performance map of the eye-tracking operation.

15. The method of claim 13, further comprising:
  adjusting the multiple UI elements of the user interface by adjusting a distance between two adjacent UI elements, adjusting a layout of the multiple UI elements, and/or adjusting a size of each UI element.

16. The method of claim 13, further comprising:
  identifying a specific UI element among the one or multiple UI elements of the user interface which the user interacts with based on information of the UI interface and the one or multiple gaze points of the user;
  determining whether the specific UI element is triggered by a gaze command associated with the one or multiple gaze points of the user; and
  performing a corresponding action associated with the specific UI element when the specific UI element is triggered by the gaze command.

17. The method of claim 16, wherein the specific UI element includes a graphic element and a hit box, and the method further comprising:
  increasing a size of the graphic element, reducing a size of the hit box, and reducing a fixation duration of the hit box when the specific UI element corresponds to a high performance level of the performance map of the eye-tracking operation; or
  reducing the size of the graphic element, increasing the size of the hit box, and increasing the fixation duration of the hit box when the specific UI element corresponds to a low performance level of the performance map of the eye-tracking operation.

18. The method of claim 16, further comprising:
  increasing a distance between the specific UI element and an adjacent UI element among the multiple UI elements, rearranging the multiple UI elements so as to occupy a larger region of the UI interface.

19. The method of claim 13, further comprising:
  determining whether the performance level of the performance map of the eye-tracking operation is higher than a first threshold;
  determining whether the performance level of the performance map of the eye-tracking operation is higher than a second threshold which is lower than the first threshold; and
  adjusting the at least one UI element of the user interface based on the performance map of the eye-tracking operation when determining that the performance level of the eye-tracking operation is between the first threshold and the second threshold.

20. The method of claim 19, further comprising:
  informing the user of a low performance of the eye-tracking operation when determining that the performance level of the eye-tracking operation is not higher than the second threshold.

21. The method of claim 20, further comprising:
informing the user of the low performance of the eye-tracking operation by changing an appearance of each UI element, blurring each UI element, and/or randomizing a location of each UI element.

22. The method of claim 21, further comprising:
deactivating a gaze-based interaction of each UI element and/or requesting the user to re-calibrate the eye-tracking operation after informing the user of the low performance of the eye-tracking operation.

23. The method of claim 13, further comprising:
constructing the performance map of the eye-tracking operation according to an accuracy, a stability, or a precision of the eye tracking operation acquired based on the one or multiple eye images of the user and the one or multiple images of the field of view of the user.

* * * * *